United States Patent [19]

Mort

[11] 4,426,059

[45] Jan. 17, 1984

[54] VACUUM MOUNTING SUPPORT FOR A ROOF TRUSS FORMING MACHINE

[76] Inventor: Edgar A. Mort, 128 College La., Poland, Ohio 44514

[21] Appl. No.: 251,315

[22] Filed: Apr. 6, 1981

[51] Int. Cl.³ .............................................. F16M 1/00
[52] U.S. Cl. ................................... 248/637; 100/100; 269/21
[58] Field of Search ................. 248/637, 205.5, 205.6, 248/205.7, 205.8, 205.9, 206.2, 362, 363; 269/21; 279/3; 100/100

[56] References Cited

U.S. PATENT DOCUMENTS

| | | | |
|---|---|---|---|
| 2,443,987 | 6/1948 | Morrison et al. ....................... | 269/21 |
| 2,876,026 | 3/1959 | Mancini ....................... | 248/205.8 X |
| 3,068,484 | 12/1962 | Moehlenpah et al. | |
| 3,069,684 | 12/1962 | Moehlenpah et al. | |
| 3,239,022 | 3/1966 | Dolphin ............................. | 16/24 X |
| 3,255,943 | 6/1966 | Sanford . | |
| 3,358,348 | 12/1967 | McGlinchey . | |
| 3,530,790 | 9/1970 | Post . | |
| 3,599,562 | 8/1971 | Hutchens, Sr. . | |
| 3,771,439 | 11/1973 | Mort . | |
| 4,123,819 | 11/1978 | Benedetti ............................. | 16/24 |

*Primary Examiner*—J. Franklin Foss
*Attorney, Agent, or Firm*—Harpman & Harpman

[57] ABSTRACT

A roof truss forming machine for assembling and nailing with nail plates timbers into a planar roof truss includes a jig frame having a base with a continuous inflatable tubular member arranged thereon for creating a seal between the base and a supporting floor surface and a vacuum machine for creating a partial vacuum between the base and the seal to hold the roof truss forming machine in a desired location. A plurality of such machines arranged in a desired pattern simultaneously drive nailer plates into the timbers forming the truss.

5 Claims, 4 Drawing Figures

VACUUM MOUNTING SUPPORT FOR A ROOF TRUSS FORMING MACHINE

BACKGROUND OF THE INVENTION (1) Technical Field

This invention relates to roof truss forming machines such as shown for example in my U.S. Pat. No. 3,771,439.

(2) Description of the Prior Art

Prior structures of this type may be seen in my above referred to patent and in U.S. Pat. Nos. 3,068,484, 3,069,684, 3,255,943, 3,358,348, 3,530,790 and 3,599,562. The several roof truss forming machines of the prior art required arranging of the same in a desired pattern conforming with the shape of the truss to be formed and as will be seen by referring to the above prior art patents, the machine usually employed a stationary enlongated rail with a plurality of bridges or support arms extending laterally therefrom with the actual roof truss forming machines located along the rail and on the bridges or the support arms. No prior art is known wherein individual roof truss forming machines could be freely positioned in a desired pattern on a supporting floor and temporarily securely positioned in the desired location in the pattern.

The present invention provides for the temporary secure positioning of the roof truss machines in the desired pattern by creating a seal with the supporting floor surface and then forming a partial vacuum within the area of the seal to securely attach the roof truss forming machine to the floor.

SUMMARY OF THE INVENTION

A vacuum mounting support for a roof truss forming machine provides the jig frame support of the machine with a flat air impervious plate closely spaced to the floor on which the machine is to be positioned and provides a continuous inflatable tubular sealing member on the lower surface of the plate together with a device for inflating the tubular sealing member and for creating a partial vacuum between the plate and the floor and within the area defined by the tubular sealing member so as to temporarily securely attach the roof truss forming machine to the floor in a desired location.

DESCRIPTION OF THE PREFERRED EMBODIMENT

Figure 2:
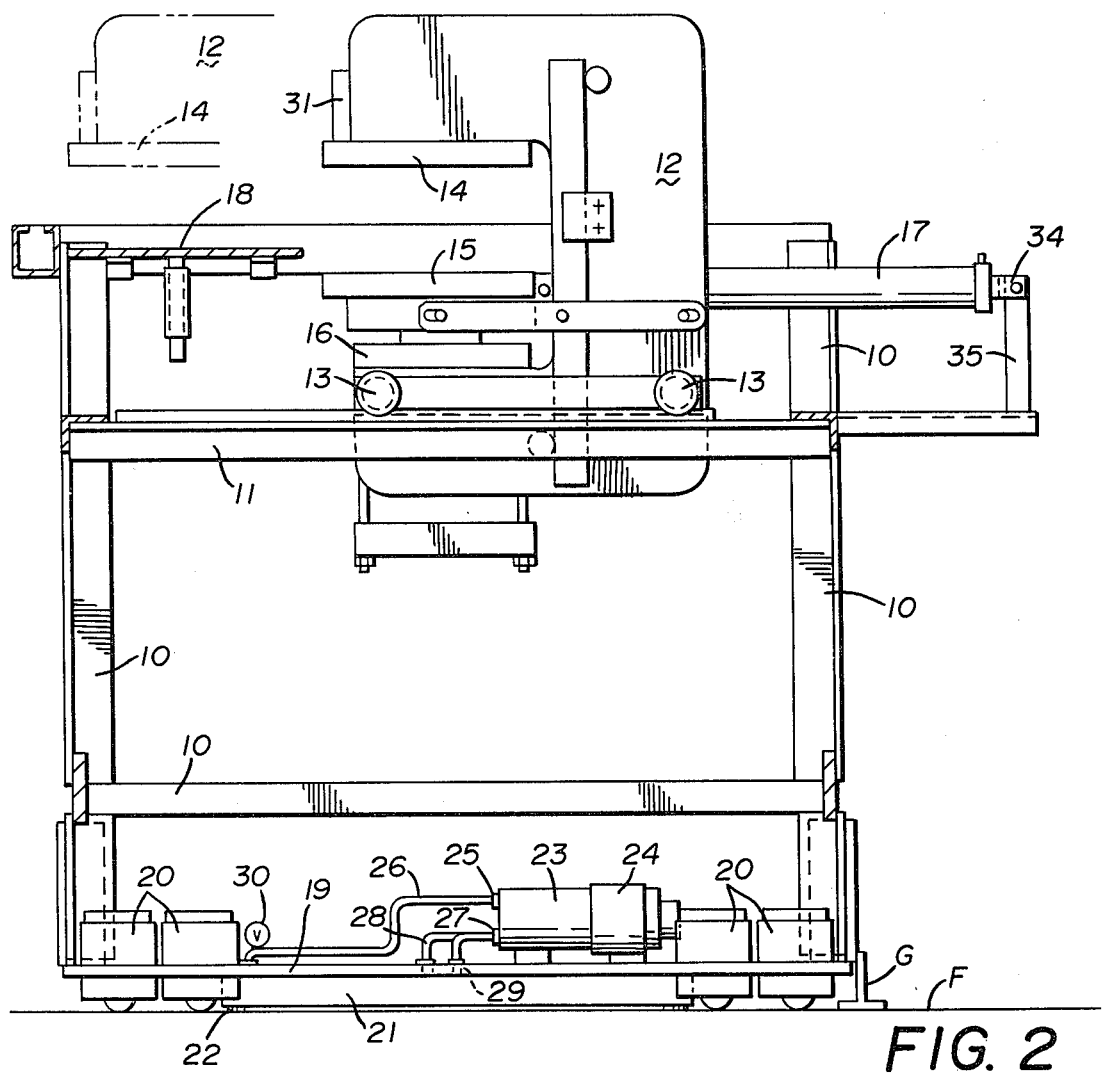
FIG. 2 is a side elevation of a roof truss forming machine with a vacuum mounting on the jig frame support thereof.

In the form of the invention chosen for illustration herein, the vacuum mounting support for a roof truss forming machine is best illustrated in the side elevation of FIG. 2 of the drawings and by referring thereto it will be seen that a jig frame support 10 has spaced parallel rails 11 on which C-clamps 12 are movably positioned as by rollers 13.

The C-clamps 12 have fixed upper jaws 14 and vertically movable lower jaws 15. The vertically movable lower jaws 15 are arranged to be moved by piston and cylinder assemblies 16 which are in turn provided with a source of fluid power and suitable controls therefor. A secondary piston and cylinder assembly 17 is provided for moving the C-clamp 12 along the spaced parallel rails 11 of the jig frame support 10 and toward and away from a removable table 18 on the jig frame support 10. The removable table 18 provides a support for timbers arranged in a truss shaped to be secured to one another by nailer plates through the action of the C-clamp 12 as will be understood by those skilled in the art.

Figure 1:
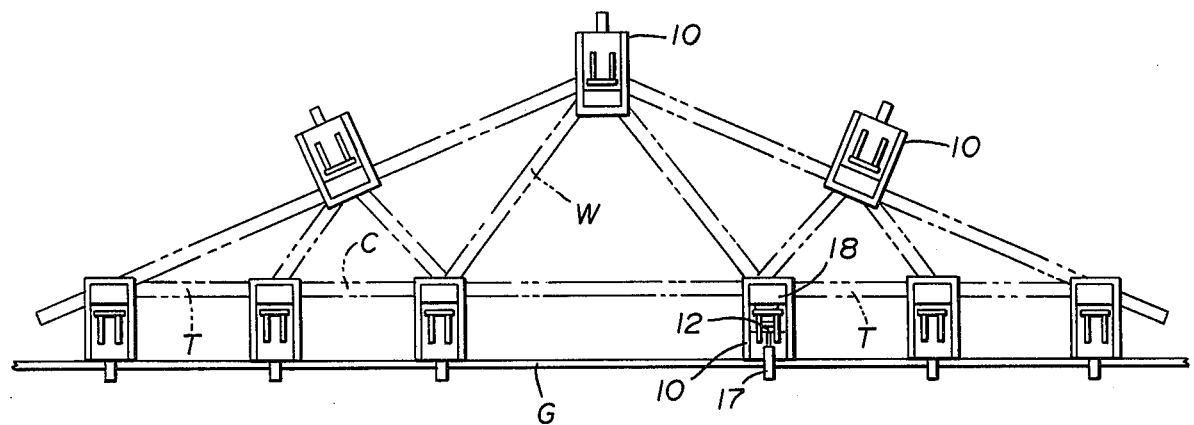
FIG. 1 is a top plan schematic view of a plurality of roof truss forming machines arranged in a roof truss configuration.

By referring now to FIG. 1 of the drawings, it will be seen that a symbolic representation of a plurality of the roof truss forming machines identified by their jig frame supports 10 and the tables 18 thereon are arranged in a pattern corresponding with a desired shape of a roof truss having upper and lower chords C and interconnecting webs W. The desired pattern of the timbers to be formed into the roof truss will be seen to be such that the joints between the chords C and the webs W are positioned on the tables 18 of the roof truss forming machines so that nailer plates positioned over such joints can be uniformly and accurately engaged in the timbers to form suitable fasteners therebetween as will occur to those skilled in the art.

Still referring to FIG. 1 of the drawings, it will be seen that an elongated guide rail G is shown against which the roof truss forming machine may be conveniently engaged to form a straight line.

Referring again to FIG. 2 of the drawings and the lower portion of the jig frame support 10, it will be seen that an air impervious flat plate 19 forms the lowermost portion of the jig frame support 10 and that it is spaced a relatively short distance above the floor F on which the machine is positioned. A number of roller casters 20 are positioned in the corners of the plate 19 and they are of the type that can be vertically adjusted so that they can be easily leveled to uniformly engage the floor F and to position a downwardly facing cross sectionally U-shaped channel 21 which is attached to the bottom of the plate 19 with its lowermost edges in close proximity to the floor F.

Figure 4:
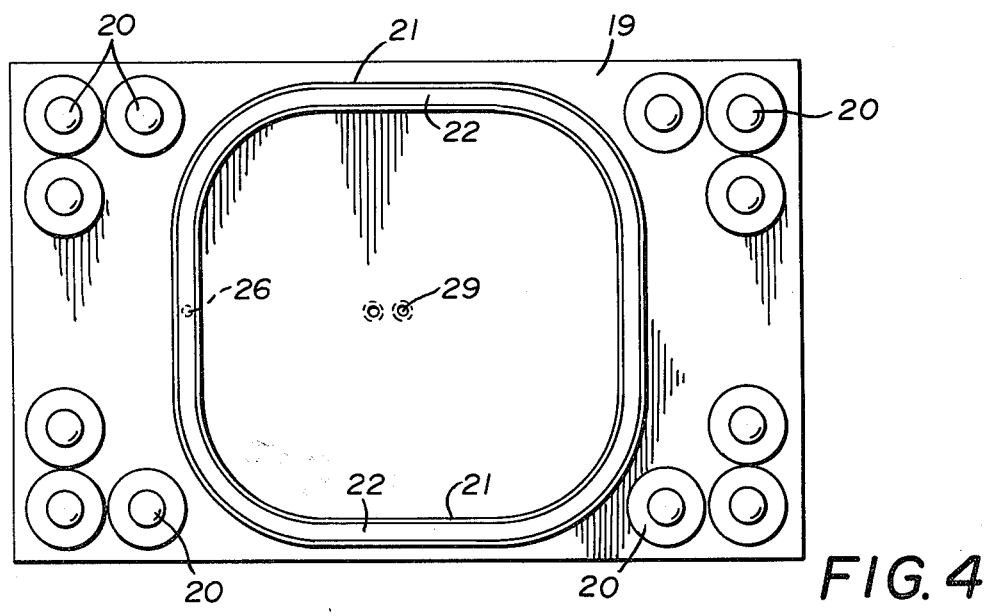
FIG. 4 is a bottom plan view thereof.

As best seen in FIGS. 2 and 4 of the drawings the channel 21 is endless and defines an area of the plate 19 that is substantially large in comparison with its overall area.

In FIG. 4 of the drawings, an endless inflatable resilient tube 22 is shown positioned in the channel 21 and arranged so that when it is inflated it will expand downwardly into sealing engagement against the floor F as shown in FIG. 2 of the drawings. In order that the inflatable tube 22 can be inflated, a reversible pump 23 is provided and may be seen in FIG. 2 of the drawings as being mounted on the upper surface of the plate 19. It is driven by an electric motor 24 which is arranged to be connected to a suitable power source and controlled by suitable switches, not shown.

The output port of the pump 23 is indicated at 25 and a tube 26 extends therefrom to a point of communication with the inflatable tube 22. The inlet port of the pump 23 is indicated by the numeral 27 and one or more tubes 28 extend therefrom to one or more openings 29 in the plate 19 so as to communicate with the area defined by the inflatable tube 22 as positioned in the channel 21. The inflatable resilient expandable tube 22 is preferably attached to the uppermost portion of the channel 21 as seen in FIG. 2 of the drawings so that when it is inflated as by the operation of the pump 23, it will expand downwardly and outwardly of the channel 21 and into forceful engagement with the floor F to form an airtight seal. The area thus defined by the inflated tube 22 may be partially evacuated by reversing the pump 23 so as to create a partial vacuum therein which securely attaches the jig frame support 10 of the roof truss forming machine to the floor. A pressure controlling valve 30 is preferably arranged in communication with the tube 26 so that the degree of inflation of the inflatable expansible sealing tube 22 may be controlled.

It will occur to those skilled in the art that rather than using a single reversible pump 23 as shown and described herein, a pair of pumps may be substituted, one of which evacuates the area below the plate 19 as defined by the inflatable tube 22 and the other of which inflates the inflatable tube 22.

Figure 3:
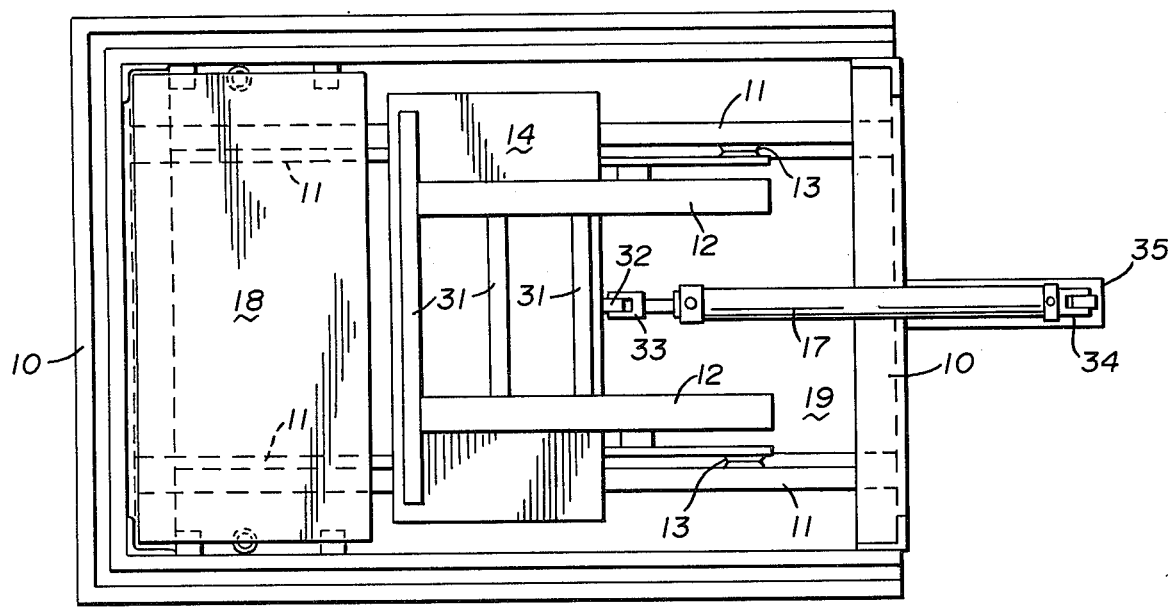
FIG. 3 is a top plan view of the roof truss machine of FIG. 2.

By referring now to FIG. 3 of the drawings, it will be seen that the C-clamp 12 heretofore referred to is formed of a pair of vertically positioned C-shaped members and that the fixed upper jaw 14 is attached thereto as by welding and reinforced by a plurality of reinforcing bars 31 positioned across the upper surface of the fixed jaw 14 and attached to the members 12. An apertured bracket 32 is attached to one edge of the fixed upper jaw 14 and serves as a means of connecting the same to the piston of the secondary piston and cylinder assembly 17 heretofore referred to. A bifurcated end 33 on the piston rod of the secondary piston and cylinder assembly 17 is pivotally attached to the apertured bracket 32. The opposite end of the secondary piston and cylinder assembly 17 is provided with a bifurcated bracket 34 which is pivotally engaged on a structural extension 35 of the jig frame support 10 as best seen in FIG. 2 of the drawings.

In operation, a plurality of the roof truss forming machines equipped with the vacuum mounting support of the present invention are assembled in the pattern shown in FIG. 1 of the drawings and hereinbefore described. The pump 23 is actuated to inflate the inflatable distortable sealing tube 22 and then operated to partially evacuate the area defined by the sealing tube 22 so as to create a partial vacuum which acts to temporarily securely attach the roof truss machine and its vacuum mounting support to the floor F. This action occurs in each of the several roof truss machines.

When the plurality of machines are arranged in the desired pattern, as for example that of FIG. 1 of the drawings, the timbers from which the roof truss is to be formed are positioned on the tables 18 with the joints between the timbers centrally located on the tables and the several nailer plates positioned so as to engage the timbers to be joined.

The C-clamp 12 of each machine is then actuated to drive the nailer plates from the timbers and securely fasten the same to one another and thus form the desired roof truss. The pattern in which the roof truss machines are arranged and temporarily positioned by the device of the invention remains the same as long as trusses of the same configuration are being produced. When trusses of a different size or a different configuration are to be produced, the partial vacuum beneath the plate 19 and within the area defined by the sealing tube 22 is terminated by venting the area to atmosphere and the several machines moved to a new pattern whereupon the steps hereinbefore recited are repeated.

Although but one embodiment of the present invention has been illustrated and described, it will be apparent to those skilled in the art that various changes and modifications may be made therein witout departing from the spirit of the invention and having thus described my invention what I claim is:

1. An improvement in a roof truss forming machine for assembling and nailing with nail plates timbers into a planar roof truss, a jig frame support forming a portion of said machine, the improvement comprising means for attaching said machine to a supporting surface such as a floor, said means for attaching said machine to a supporting surface such as a floor including means on said machine movably engaging said supporting surface, an air impervious horizontally disposed member in the lower portion of said jig support frame arranged in closely spaced relation to said floor, endless inflatable means on said air impervious member defining a large area thereon and selectively engagable with said floor for defining an enclosure in which a partial vacuum may be formed, means for partially evacuating said enclosure so as to form a partial vacuum whereby said jig frame support of said roof truss machine may be secured to said floor.

2. The improvement in a roof truss forming machine set forth in claim 1 and wherein said air horizontally disposed impervious member in the lower portion of said jig support frame comprises a flat plate.

3. The improvement in a roof truss forming machine set forth in claim 1 and wherein said means for partially evacuating said area comprises a vacuum pump and means for energizing the same.

4. The improvement in a roof truss forming machine set forth in claim 1 and wherein said endless inflatable means on said air impervious horizontally disposed member selectively engagable with said floor for defining an enclosure in which a portion vacuum may be formed comprises an inflatable resilient distortable continuous tubular member sealed to said horizontally disposed member on the lower side thereof and means for inflating and deflating said tubular member arranged to move the same into and out of sealing relation between said horizontally disposed air impervious member and said floor.

5. The improvement in a roof truss forming machine set forth in claim 1 and wherein said air impervious horizontally disposed member is a flat plate and the means selectively engagable with the floor is a continuously extending channel member attached to the bottom of said flat plate with said channel opening downwardly and said inflatable means is a resilient distortable continuous tubular member positioned in said channel and sealed with respect thereto and movable outwardly of said U-shaped channel when inflated.

* * * * *